United States Patent

Kohlhammer et al.

[11] Patent Number: 6,117,960
[45] Date of Patent: Sep. 12, 2000

[54] WATER-SOLUBLE CROSS-LINKABLE COPOLYMERS

[75] Inventors: Klaus Kohlhammer, Marktl; Gerhard Koegler, Burgkirchen; Peter Ball, Emmerting; Monika Rockinger, Unterneukirchen; Walter Dobler, Tann, all of Germany

[73] Assignee: Wacker-Chemie GmbH, Munich, Germany

[21] Appl. No.: 09/142,399

[22] PCT Filed: Mar. 6, 1997

[86] PCT No.: PCT/EP97/01137

§ 371 Date: Sep. 4, 1998

§ 102(e) Date: Sep. 4, 1998

[87] PCT Pub. No.: WO97/32911

PCT Pub. Date: Sep. 12, 1997

[30] Foreign Application Priority Data

Mar. 7, 1996 [DE] Germany .......................... 196 08 910

[51] Int. Cl.[7] .......................... C08F 228/02; C08L 41/00; C08L 39/00
[52] U.S. Cl. .......................... 526/287; 526/312; 524/555; 524/609; 524/817; 523/342
[58] Field of Search .................... 524/555, 609, 524/817; 526/287, 240, 312; 523/342

[56] References Cited

U.S. PATENT DOCUMENTS

| | | |
|---|---|---|
| 3,965,032 | 6/1976 | Gibbs et al. . |
| 4,076,928 | 2/1978 | Gross ........................ 526/240 |
| 4,617,321 | 10/1986 | MacDonald . |
| 4,736,005 | 4/1988 | Castner . |
| 5,278,222 | 1/1994 | Stack . |

FOREIGN PATENT DOCUMENTS

| | | |
|---|---|---|
| 0029970 | 6/1981 | European Pat. Off. . |
| 0094898 | 12/1986 | European Pat. Off. . |
| 0629650 | 12/1994 | European Pat. Off. . |
| 0671435 | 9/1995 | European Pat. Off. . |
| 2003769 | 11/1969 | France . |
| 2618898 | 11/1977 | Germany . |
| 1253450 | 11/1971 | United Kingdom . |
| 2099833 | 12/1982 | United Kingdom . |

*Primary Examiner*—Tae Yoon
*Attorney, Agent, or Firm*—Burgess, Ryan & Wayne

[57] ABSTRACT

The invention concerns water-soluble cross-linkable copolymers having a molecular weight of $\leq 500000$ and comprising a) between 20 and 95 wt. % sulphonic-acid- or sulphonate-group-containing monomer units; b) between 4 and 80 wt. % N-methylol- or N-alkoxymethyl-group containing monomer units; and c) between 0.1 and 20 wt. % hydrophobic monomer units selected from the group comprising water-insoluble ethylenically unsaturated compounds and hydrophobic end groups of initiator radicals or regulator molecules, the portions in wt. % being relative to the total weight of the copolymer. The portion of sulphonic-acid- or sulphonate-group-containing monomer units can optionally be substituted by up to 50 wt. %, relative to the portion by weight of monomer units a), by carboxyl-group-containing monomer units d) or amide-group-containing monomer units e).

20 Claims, No Drawings

WATER-SOLUBLE CROSS-LINKABLE COPOLYMERS

BACKGROUND OF THE INVENTION

The invention relates to water-soluble, cross-linkable copolymers, processes for their preparation and their use.

Water-soluble polymers with ionic groups, so-called polyelectrolytes, have been known for a long time. These substances are polymers in which ionic groups, such as, for example, carboxylate or sulphonate groups, are firmly bonded to the polymer backbone via a chemical bond. As a rule good water-solubility and quite specific rheological properties, in general a high viscosity in an aqueous medium, result from this.

These polyelectrolytes are prepared by free radical polymerization of water-soluble, ethylenically unsaturated compounds which contain ionic groups. Examples of these are: acrylic acid, N-methylolacrylamide, acrylamido-2-methylpropanesulphonic acid (AMPS) and styrenesulphonic acid. Very high molecular weight polymers, aqueous solutions of which have a high viscosity, result from this preparation.

EP-B 94898 (U.S. Pat. No. 4,736,005) describes the preparation of very high molecular weight (molecular weight >1,000,000) terpolymers of 30 to 95% of dimethylacrylamide (DMA), 0.1 to 10% of N-methylolacrylamide (NMA) and 4 to 50% of acrylamidomethylpropanesulphonate (AMPS) and their use as rheological additives in the production of crude oil.

DE-A 2618898 (U.S. Pat. No. 3,965,032) relates to colloidal dispersions which comprise a water-soluble or water-dispersable copolymer polyelectrolyte with nonionic hydrophobic units, for example methyl methacrylate, and ionic hydrophilic units, for example AMPS, the preparation of which is carried out in solution polymerization in a water-miscible solvent. In concrete terms, copolymers which comprise the hydrophobic component in an excess of 2:1 to 6:1 are described.

EP-A 629650 (U.S. Pat. No. 5,278,222) and EP-A 671435 describe water-soluble and water-insoluble polymers of hydrophobic monomer units and 15 to 80% by weight or 30 to 50% by weight of monomers containing sulphonate groups as spraying auxiliaries in the spray drying of aqueous polymer dispersions.

Water-soluble polymers with high contents of crosslinkable water-soluble monomer units, such as N-methylolacrylamide (NMA), would in principle be of interest in the form of aqueous solutions thereof as binders for coating compositions or adhesives. Another conceivable use would be that as dispersing agents in aqueous polymer dispersions. Water-soluble polymers with a high NMA content have the tendency to have high molecular weights, with a correspondingly high viscosity of the aqueous solution. Water-soluble acrylic compounds, such as acrylic acid or N-methylolacrylamide, which is customary as a crosslinking agent, in fact tend to have very high degrees of polymerization, which severely impedes widespread use because of the resulting high viscosities.

Another disadvantage of polyelectrolytes based on water-soluble monomers is that such polyelectrolytes are often incompatible with a polymer dispersion and the aqueous polyelectrolyte solution separates off from the polymer dispersion as a serum.

SUMMARY OF THE INVENTION

The invention was therefore based on the object of providing water-soluble and crosslinkable polyelectrolytes which have relatively low molecular weights, in spite of a predominant content of water-soluble comonomer, and which, when used as an additive to aqueous polymer dispersions, show a high affinity for the dispersed phase and surface-active properties.

Surprisingly, it has been found that significantly lower molecular weights can be achieved by copolymerization of N-methylolacrylamide with acrylic compounds containing sulphonic acid or sulphonate groups. It has furthermore been found, surprisingly, that significantly lower surface tensions and lower viscosities already result by copolymerization of only small amounts of hydrophobic comonomers.

The invention relates to water-soluble, cross-linkable copolymers having a molecular weight of $\leq 500,000$, comprising
a) 20 to 95% by weight of monomer units containing sulphonic acid or sulphonate groups,
b) 4 to 80% by weight of monomer units containing N-methylol or N-alkoxymethyl groups and
c) 0.1 to 20% by weight of hydrophobic monomer units from the group consisting of water-insoluble, ethylenically unsaturated compounds and the hydrophobic end groups of initiator radicals or regulator molecules,
the contents in % by weight being based on the total weight of the copolymer, and it being possible, where appropriate, for up to 50% by weight, based on the weight content of monomer units a), of the content of monomer units containing sulphonic acid/sulphonate groups to be replaced by monomer units d) containing carboxyl groups or monomer units e) containing amide groups.

Water-soluble, crosslinkable copolymers having a molecular weight of $\leq 500,000$ comprising
a) 30 to 87% by weight of monomer units containing sulphonic acid or sulphonate groups,
b) 12 to 60% by weight of monomer units containing N-methylol or N-alkoxymethyl groups and
c) 1 to 10% by weight of hydrophobic monomer units from the group consisting of water-insoluble, ethylenically unsaturated compounds and the hydrophobic end groups of initiator radicals or regulator molecules,
the contents in % by weight being based on the total weight of the copolymer, are preferred.

Water-soluble, crosslinkable copolymers having a molecular weight of $\leq 500,000$ comprising
a) 70 to 87% by weight of monomer units containing sulphonic acid or sulphonate groups,
b) 12 to 25% by weight of monomer units containing N-methylol or N-alkoxymethyl groups and
c) 1 to 5% by weight of hydrophobic monomer units from the group consisting of water-insoluble, ethylenically unsaturated compounds and the hydrophobic end groups of initiator radicals or regulator molecules,
the contents in % by weight being based on the total weight of the copolymer, are particularly preferred.

DESCRIPTION OF THE PREFERRED EMBODIMENTS

Suitable monomer units a) are, for example, water-soluble, ethylenically unsaturated compounds which can be polymerized by free radicals and contain sulphonic acid or sulphonate groups —$SO_3M$, where M=H or an alkali metal, ammonium or alkaline earth metal ion. Preferred monomer units are 2-acrylamido-2-methylpropanesulphonic acid (AMPS), styrenesulphonic acid, sulphoalkyl (meth)-acrylates, sulphoalkyl itaconates, preferably in each case with a $C_1$- to $C_6$-alkyl radical, and vinylsulphonic acid and ammonium, alkali metal or alkaline earth metal salts thereof.

Particularly preferred monomer units are 2-acrylamido-2-methylpropanesulphonic acid (AMPS), styrenesulphonic acid, sulphopropyl acrylate, sulphopropyl itaconate and vinylsulphonic acid and ammonium, sodium, potassium and calcium salts thereof.

Suitable monomer units b) are, for example, water-soluble, ethylenically unsaturated compounds which can be polymerized by free radicals and contain N-methylol groups (—NH—CH$_2$OH) or etherified derivatives thereof (—NH—CH$_2$OR, where R=C$_1$–C$_6$-alkyl). Preferred monomer units are N-methylolacrylamide (NMA), N-methylolmethacrylamide (NMMA), N-(isobutoxymethyl)-acrylamide (IBMA), N-(isobutoxymethyl)-methacrylamide and N-(n-butoxymethyl)-acrylamide (NBMA). Particularly preferred monomer units are N-methylolacrylamide and N-(isobutoxymethyl) -acrylamide.

Suitable monomer units c) are ethylenically unsaturated compounds which can be (co)polymerized by free radicals, are soluble in water to the extent of less than 2% by weight at 23° C. and contain hydrophobic end groups of initiator radicals or regulator molecules having in each case more than 8 C atoms. Preferred monomer units are esters of acrylic acid or methacrylic acid having more than 3 C atoms, such as methyl methacrylate, vinyl aromatics, such as styrene or vinyl toluene, olefins, such as ethylene or propylene, vinyl halides, such as vinyl chloride, and vinyl esters of aliphatic carboxylic acids having more than 2 C atoms. The preferred end group of regulator molecules is the dodecyl radical of dodecylmercaptan. Particularly preferred monomer units are methyl methacrylate, styrene, vinyl propionate, isopropenyl acetate(1-methylvinyl acetate), vinyl laurate and vinyl esters of α-branched monocarboxylic acids having 5 to 10 C atoms, such as VeoVa9$^R$ or VeoVa10$^R$.

Suitable monomers d) containing carboxyl groups are water-soluble ethylenically unsaturated compounds which can be polymerized by free radicals and contain carboxyl groups —COOM, where M=H or alkali metal, ammonium or alkaline earth metal ions. Preferred monomers are acrylic acid, methacrylic acid, crotonic acid and itaconic acid. Suitable monomers e) containing amide groups are water-soluble, ethylenically unsaturated compounds which can be polymerized by free radicals and contain amide groups —CONH$_2$. Acrylamide and methacrylamide are preferred and acrylamide is particularly preferred.

Water-soluble here in general means that the solubility in water at 23° C. is at least 10% by weight. The molecular weight is stated as the weight average, determined by means of gel permeation methods (GPC) against sodium polystyrene-sulphonate standards.

The preparation of the copolymers according to the invention is preferably carried out by free radical polymerization in aqueous solution at a reaction temperature of preferably 40° C. to 80° C. The polymerization can be carried out by initially introducing all or individual constituents of the reaction mixture into the reaction vessel, or by initially introducing portions of the components and topping up the constituents or individual constituents of the reaction mixture, or by the metering process without an initial mixture.

The initiation is carried out by means of the customary water-soluble agents which form free radicals, which are preferably employed in amounts of 0.01 to 3.0% by weight, based on the total weight of the monomers. Examples of these are ammonium and potassium persulphate, hydrogen peroxide, and potassium, sodium and ammonium peroxodiphosphate. If appropriate, the free radical initiators mentioned can also be combined in a known manner with 0.01 to 1.0% by weight, based on the total weight of the monomers, of reducing agents, it being possible for the polymerization to be carried out at lower temperatures in this case. For example, alkali metal formaldehydesulphoxylates and ascorbic acid are suitable. In the case of redox initiation, one or both components of the redox catalyst are preferably metered in here during the polymerization.

The pH range desired for the polymerization, which is in general pH $\geq 2.5$, can be established in a known manner by bases or customary buffer salts, such as alkali metal phosphates or alkali metal carbonates. For establishing the molecular weight, the regulators usually used, for example mercaptans, aldehydes and chlorohydrocarbons, can be added during the polymerization.

In a particularly preferred embodiment, a portion of the mixture of comonomers a), b), c) and, if appropriate, d) and e) are initially introduced into the reaction vessel as an aqueous solution and the initial mixture is heated up to the reaction temperature. When the polymerization temperature is reached, the free radical initiator and the remainder of the comonomer mixture, in each case in aqueous solution, are slowly metered in. When metering has ended, the polymerization is brought to completion by heating the batch to 85° C. to 95° C.

In the most preferred embodiment, at least a portion of comonomers a) containing sulphonate groups, in general 5 to 60% by weight, based on the total weight of comonomers a), and a portion of N-methylol-functional comonomers b), in general 5 to 60% by weight, based on the total weight of comonomers a), are initially introduced into the reaction vessel as an aqueous solution and the remaining amount of comonomers a) and b) is metered in.

The copolymers are preferably used in the form of aqueous solutions thereof. Solids contents of 15 to 25% by weight are preferably established, depending on the uses. The copolymer solutions are suitable as binders or rheology auxiliaries for coating compositions in the textile, paper and building sector and for adhesives in the textile, paper and building sector. For example, an exceptionally good resistance to solvents and a high wet strength were found when the aqueous copolymer solution was used as an impregnating agent for nonwovens.

A preferred field of use is also the use of the copolymer solutions for antistatic treatment of textiles, for example carpets or nonwovens. For this, the textiles can be impregnated with the aqueous solution. Another possibility of antistatic treatment comprises admixing the aqueous copolymer solutions to binder dispersions for textile bonding.

On the basis of the viscosity of the aqueous copolymer solutions, which is surprisingly low for polyelectrolytes, and the additional surface-active properties induced by the hydrophobic units, the copolymers according to the invention are also outstandingly suitable for stabilizing aqueous polymer dispersions or aqueous polymer emulsions.

Aqueous polymer emulsions and aqueous polymer dispersions are accessible by means of free radical polymerization of ethylenically unsaturated monomers in a manner known to the expert. Examples of monomers which can be employed in the polymerization, by themselves or as a mixture, are vinyl esters of saturated C$_2$- to C$_{10}$-carboxylic acids, such as vinyl acetate, vinyl laurate and versatic acid vinyl ester; esters of methacrylic acid and acrylic acid with aliphatic C$_1$- to C$_8$-alcohols, such as methyl methacrylate, ethyl acrylate, butyl acrylate and ethylhexyl acrylate;

olefins, such as ethylene and propylene; vinyl aromatics, such as styrene; and vinyl halides, such as vinyl chloride.

The copolymers according to the invention can be initially introduced here, or metered in, as a protective colloid in the form of an aqueous solution thereof before or during the polymerization; usually in amounts of 1 to 15% by weight, based on the amount of monomer. Alternatively, an aqueous solution of the copolymers can also be added to the polymer emulsion or polymer dispersion in the abovementioned amount after the polymerization has ended. Another use is the use of aqueous solutions of the copolymers according to the invention as a spraying aid during spray drying of polymer dispersions.

The following examples serve to further illustrate the invention.

COMPARISON EXAMPLE 1
Preparation of an Approximately 16% Strength AMPS-NMA Polymer Solution Preparation of the monomer metering solution: 468 g of water were initially introduced into a suitable metering vessel and the following substances were dissolved in succession: 83.1 g of a 25% strength NaOH solution, 0.866 g of mercaptopropionic acid (MPA), 159 g of 2-acrylamido-2-methylpropane-sulphonic acid (AMPS) and 106 g of a 45% strength aqueous N-methylolacrylamide solution (NMA).

The following are initially introduced in succession into a 3 l laboratory reactor fitted with a blade stirrer, reflux condenser and suitable metering devices: 1.24 kg of deionized water, 54.4 g of a 25% strength NaOH solution, 0.866 g of MPA, 114 g of AMPS and 55.4 g of a 45% strength aqueous NMA solution. The initial mixture was stirred and heated up to 80° C. The polymerization was started by metering in a 2.2% strength aqueous ammonium persulphate solution (APS) over a period of 3 hours. 10 minutes after the start of the metering of APS, the monomer metering solution described above was metered in over a period of 2 hours. The polymerization was then brought to completion at 90° C. After cooling, the solution was brought to pH=7 with NaOH.

The clear solution thus prepared had a solids content of 15.4%, a pH of 7, a viscosity of 220 mPas (Brookfield, 20 rpm) and an average molecular weight of 531,000 (GPC; against Na polystyrene sulphonate standards), and the surface tension of a 5% strength aqueous solution was 67.5 mNm.

COMPARISON EXAMPLE 2
Preparation of an Approximately 16% Strength AMPS-NMA Polymer Solution Preparation of the monomer metering solution: 468 g of water were initially introduced into a suitable metering vessel and the following substances were dissolved in succession: 83.2 g of a 25% strength NaOH solution, 0.866 g of mercaptopropionic acid (MPA), 184 g of 2-acrylamido-2-methylpropane-sulphonic acid (AMPS) and 70.9 g of a 45% strength aqueous N-methylolacrylamide solution (NMA).

The following are initially introduced in succession into a 3 l laboratory reactor fitted with a blade stirrer, reflux condenser and suitable metering devices: 1.27 kg of deionized water, 55.5 g of a 25% strength NaOH solution, 0.866 g of mercaptopropionic acid MPS, 114 g of solid 2-acrylamido-2-methylpropanesulphonic acid AMPS and 37 g of a 45% strength N-methylolacrylamide solution NMA. The solution was stirred and heated up to 80° C. The polymerization was started by metering in a 2.2% strength ammonium persulphate solution (APS) over a period of 3 hours. 10 minutes after the start of the metering of APS, the monomer metering solution described above was metered in over a period of 2 hours. The polymerization was then brought to completion at 90° C. After cooling, the solution was brought to pH=7 with NaOH.

The clear solution thus prepared had a solids content of 15.8%, a pH of 7, a viscosity of 82 mPas (Brookfield, 20 rpm) and an average molecular weight of 164,000 (GPC; against Na polystyrene sulphonate standards), and the surface tension of a 5% strength aqueous solution was 65.1 mNm.

EXAMPLE 1
Preparation of an Approximately 16% Strength AMPS-NMA-STY Polymer Solution Preparation of the monomer metering solution: 459 g of water were initially introduced into a suitable metering vessel, and the following substances were dissolved in succession: 81.5 g of a 25% strength aqueous NaOH solution, 0.849 g of MPA, 4.18 g of styrene, 180 g of AMPS and 69.5 g of a 45% strength NMA solution.

The following substances were initially introduced in succession into a 3 l laboratory reactor fitted with a blade stirrer, reflux condenser and suitable metering devices: 1.28 kg of deionized water, 54.4 g of a 25% strength NaOH solution, 0.849 g of MPA, 112 g of AMPS, 36.2 g of a 45% strength NMA solution and 2.62 g of styrene. The solution was stirred and heated up to 80° C. The polymerization was started by metering in a 2.2% strength aqueous APS over a period of 3 hours. 10 minutes after the start of the metering of APS, the monomer metering solution described above was metered in over a period of 2 hours. The polymerization was then brought to completion at 90° C. After cooling, the solution was brought to pH=7 with NaOH.

The clear solution thus prepared had a solids content of 15.8%, a pH of 7, a viscosity of 48 mPas (Brookfield, 20 rpm) and an average molecular weight of 450,000 (GPC; against Na polystyrene sulphonate standards); and the surface tension of a 5% strength aqueous solution was 61.6 mNm.

EXAMPLE 2
Preparation of an Approximately 16% Strength AMPS-NMA Polymer Solution with Hydrophobic Dodecyl End Groups Preparation of the monomer metering solution: 455 g of water were initially introduced into a suitable metering vessel and the following substances were dissolved in succession: 80.9 g of a 25% strength aqueous NaOH solution, 0.843 g of MPA, 179 g of AMPS and 68.9 g of a 45% strength NMA solution.

Preparation of the regulator metering solution: 5.39 g of dodecylmercaptan were dissolved in 48.5 g of acetone in a suitable metering vessel.

The following substances were initially introduced in succession into a 3 l laboratory reactor fitted with a blade stirrer, reflux condenser and suitable metering devices: 1.21 kg of deionized water, 53.9 g of a 25% strength NaOH solution, 12.1 g of acetone, 0.843 g of MPA, 111 g of AMPS and 36.0 g of a 45% strength aqueous NMA solution and 1.35 g of dodecylmercaptan. The solution was stirred and heated up to 80° C. The polymerization was started by metering in a 2.2% strength aqueous APS solution over a period of 3 hours. 10 minutes after the start of the metering of APS, the monomer metering solution described above and the regulator metering solution were metered in over a period of 2 hours. The polymerization was then brought to completion at 90° C. After cooling, the solution was brought to Ph=7 with NaOH.

The clear solution thus prepared had a solids content of 16.3%, a pH of 7, a viscosity of 49.5 mPas (Brookfield, 20 rpm) and an average molecular weight of 148,000 (GPC; against Na polystyrene sulphonate standards); the surface tension of a 5% strength aqueous solution was 63.9 mNm.

EXAMPLE 3

Preparation of an Approximately 16% Strength AMPS-NMA-STY Polymer Solution

Preparation of the monomer metering solution: 468 g of water were initially introduced into a suitable metering vessel and the following substances were dissolved in succession: 83.1 g of a 25% strength aqueous NaOH solution, 0.866 g of MPA, 8.52 g of styrene, 173 g of AMPS and 70.8 g of a 45% strength NMA solution.

The following substances were initially introduced in succession into a 3 l laboratory reactor fitted with a blade stirrer, reflux condenser and suitable metering devices: 1.27 kg of deionized water, 55.4 g of a 25% strength NaOH solution, 0.866 g of MPA, 111 g of AMPS, 36.9 g of a 45% strength NMA solution and 5.33 g of styrene. The solution was stirred and heated up to 80° C. The polymerization was started by metering in a 2.2% strength aqueous APS solution over a period of 3 hours. 10 minutes after the start of metering of the APS, the monomer metering solution described above was metered in over a period of 2 hours. The polymerization was then brought to completion at 90° C. After cooling, the solution was brought to pH=7 with NaOH.

The clear solution thus prepared had a solids content of 15.8%, a pH of 7, a viscosity of 54 mPas (Brookfield, 20 rpm) and an average molecular weight of 377,000 (GPC; against Na polystyrene sulphonate standards); the surface tension of a 5% strength aqueous solution was 63.7 mNm.

The surface tension and the viscosity of the polymer solutions according to Examples 1 to 3 and Comparison Examples 1 and 2 are summarized in Table 3. The summary in Table 3 clearly shows that the polyelectrolytes without hydrophobic groups (comparison Examples 1 and 2) have higher surface tensions and viscosities than the polyelectrolytes with the highly hydrophobic groups (Examples 1 to 3).

Use Testing

Testing of the Solution from Example 1 as a Fibre Binder

A viscose staple tissue was impregnated with the solution from Example 1 by means of a padder, squeezed off and then dried at 150° C. for 3 minutes (amount of binder applied 29.5%). The strength of the nonwoven impregnated in this way was tested in the transverse direction. The tests were carried out with the dry nonwoven and after storage in water or isopropanol for in each case one minute. For this, in each case 3 strips of nonwoven 150 mm long and 15 mm wide were laid one on top of the other and tested together. The measurement conditions were as follows: clamped length 100 mm, clamped width 15 mm, measurement speed 100 mm/minute. The ultimate tensile stress strength, that is to say the maximum tensile force achieved in the context of measurement, was documented as the measurement value. The measurement results are summarized in Table 1:

TABLE 1

|  | Dry | Storage in $H_2O$ | Storage in isopropanol |
|---|---|---|---|
| Ultimate tensile test strength [N] | 24.7 | 4.8 | 23.8 |

It is remarkable that the strength after storage in isopropanol approximately corresponds to the strength of the dry nonwoven.

Testing of the Solution from Example 1 for Antistatic Treatment of Carpets

A needlefelt treated with 30% of binder on the reverse was sprayed with 0.2% or 0.5%, based on the amount of binder, of the solution from Example 1 and dried at 150° C. for 3 minutes. The half-life of electrostatic discharge on the carpet thus treated was tested in accordance with DIN VDE 0303 Part 8 at different relative atmospheric humidities (10%, 30%, 50%). The voltage applied was 10 kV and the measurement temperature was 27° C. The measurement results are summarized in Table 2:

TABLE 2

| Atmospheric humidity | 10% | 30% | 50% |
|---|---|---|---|
| Needlefelt | >30 minutes | 1.5 minutes | 9 seconds |
| Needlefelt + 0.2% of solution | >30 minutes | 12 seconds | 8 seconds |
| Needlefelt + 0.5% of solution | 15 minutes | 9 seconds | 1 second |

The antistatic effect of the polymer according to the invention caused a significant reduction in the half-life of the electrostatic discharge.

TABLE 3

| | Monomer component | | | | |
|---|---|---|---|---|---|
| Example | b) [% by weight] | a) [% by weight] | c) [% by weight] | Surface tension [mNm] | Viscosity [mPas] |
| Comparison Example 1 | 21.0 NMA | 79.0 AMPS | — | 67.5 | 220.0 |
| Comparison Example 2 | 14.0 NMA | 86.0 AMPS | — | 66.1 | 82.0 |
| Example 1 | 13.7 NMA | 84.4 AMPS | 1.9 STY | 61.6 | 48.0 |
| Example 2 | 13.7 NMA | 84.3 AMPS | 2.0 DDM | 63.9 | 49.5 |
| Example 3 | 13.5 NMA | 82.7 AMPS | 3.8 STY | 62.9 | 54.0 |

NMA = N-methylolacrylamide; AMPS = 2-acrylamido-2-methylpropanesulphonic acid; STY = styrene; DDM = dodecylmercaptan

What is claimed is:

1. Water-soluble, crosslinkable copolymers having a weight average molecular weight of ≦500,000, comprising:
   a) 20 to 95% by weight of residues of at least one monomer unit selected from the group consisting of monomer units containing sulphonate groups,
   b) 4 to 80% by weight of residues of at least one monomer unit selected from the group consisting of monomer units containing N-methylol groups and monomer units containing N-alkoxymethyl groups and
   c) 0.1 to 20% by weight of residues of at least one hydrophobic monomer unit selected from the group consisting of water-insoluble, ethylenically unsaturated compounds, hydrophobic end groups of initiator radicals and hydrophobic end groups of regulator molecules, the contents in % by weight being based on the total weight of the copolymer, and wherein up to 50% by weight, based on the weight content of the residues of monomer units a) containing sulphonic acid/sulphonate groups can be replaced by residues of at least one member selected from the group consisting of monomer units d) containing carboxyl groups and monomer units e) containing amide groups.

2. Water-soluble, crosslinkable copolymers having a weight average molecular weight of $\leq 500,000$ comprising:
   a) 30 to 87% by weight of residues of at least one monomer unit selected from the group consisting of monomer units containing sulphonic acid groups and monomer units containing sulphonate groups,
   b) 12 to 60% by weight of residues of at least one monomer unit selected from the group consisting of monomer units containing N-methylol groups and monomer units containing N-alkoxymethyl groups and
   c) 1 to 10% by weight of residues of at least one hydrophobic monomer unit selected from the group consisting of water-insoluble, ethylenically unsaturated compounds, the contents in % by weight being based on the total weight of the copolymer.

3. The copolymers according to claim 1 which comprise, as monomer units a), at least one monomer unit selected from the group consisting of 2-acrylamido-2-methylpropanesulphonic acid (AMPS), styrenesulphonic acid, sulphopropyl acrylate, sulphopropyl itaconate, vinylsulphonic acid and ammonium, sodium, potassium and calcium salts of the members of the group.

4. The copolymers according to claim 1 which comprise, as residues of monomer units b) and at least one member selected from the group consisting of N-methylolacrylamide and N-(isobutoxymethyl)-acrylamide.

5. A copolymer according to claim 1 which comprises, as monomer units c), at least one member selected from the group consisting of esters of acrylic acid, methacrylic acid having more than 3 carbon atoms, vinyl aromatics, olefins, vinyl halides, vinyl esters of aliphatic carboxylic acids having more than 2 carbon atoms and hydrophobic end groups of initiator radicals having more than 8 carbon atoms and regulator molecules having more than 8 carbon atoms.

6. A process for the preparation of copolymers according to claim 1 which comprises free radical polymerization of monomers a), b), c) and, optionally, d) and e) in aqueous solution at a polymerization temperature of 40° C. to 80° C. by means of initiation with water-soluble free radical initiators, at least a portion of comonomers a) containing sulphonate groups, 5 to 60% by weight, based on the total weight of comonomers a), and a portion of N-methylol-functional comonomers b), 5 to 60% by weight, based on the total weight of comonomers a), being initially introduced into a polymerization vessel as an aqueous solution to form a mixture, bringing the mixture to the polymerization temperature metering into the polymerization vessel an aqueous solution of the free radical initiator and the comonomers in an aqueous solution.

7. An aqueous solution of the water-soluble, crosslinkable copolymers of claim 1.

8. A polymer emulsion containing as a stabilizing protective colloid, the aqueous solution of claim 7.

9. In a process for spray drying polymer dispersions, the improvement which comprises adding to the dispersions as a spraying aid, the water-soluble, crosslinkable copolymers of claim 1.

10. A process for imparting antistatic properties to textiles which comprises treating said textiles with the aqueous solution of claim 7.

11. Coating compositions containing as at least one binder therefor, a water-soluble crosslinkable copolymer of claim 1.

12. Adhesive compositions containing as at least one binder therefor, a water-soluble crosslinkable copolymer of claim 1.

13. An aqueous solution of the water-soluble, crosslinkable copolymers of claim 2.

14. A polymer emulsion containing as a stabilizing protective colloid, the aqueous solution of claim 13.

15. In a process for spray drying polymer dispersions, the improvement which comprises adding to the dispersions as a spraying aid, the water-soluble, crosslinkable copolymers of claim 2.

16. A process for imparting antistatic properties to textiles which comprises treating said textiles with the aqueous solution of claim 13.

17. Coating compositions containing as at least one binder therefor, a water-soluble crosslinkable copolymer of claim 2.

18. The copolymers according to claim 2 which comprise, as monomer units a), at least one monomer unit selected from the group consisting of 2-acrylamido-2-methylpropanesulphonic acid (AMPS), styrenesulphonic acid, sulphopropyl acrylate, sulphopropyl itaconate, vinylsulphonic acid and ammonium, sodium, potassium and calcium salts of the member of the group.

19. The copolymers according to claim 2 which comprise, as residues of monomer units b) and at least one member selected from the group consisting of N-methylolacrylamide and N-(isobutoxymethyl)-acrylamide.

20. A copolymer according to claim 2 which comprises, as monomer units c), at least one member selected from the group consisting of esters of acrylic acid, methacrylic acid having more than 3 carbon atoms, vinyl aromatics, olefins, vinyl halides, vinyl esters of aliphatic carboxylic acids having more than 2 carbon atoms and hydrophobic end groups of initiator radicals having more than 8 carbon atoms and regulator molecules having more than 8 carbon atoms.

* * * * *